United States Patent

Duesterhoeft

(10) Patent No.: US 7,253,535 B2
(45) Date of Patent: Aug. 7, 2007

(54) ELECTRICAL STARTER GENERATOR SYSTEM FOR A GAS TURBINE ENGINE

(75) Inventor: Kurt W. Duesterhoeft, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 54 days.

(21) Appl. No.: 11/227,302

(22) Filed: Sep. 15, 2005

(65) Prior Publication Data

US 2007/0132245 A1 Jun. 14, 2007

(51) Int. Cl.
*F02N 11/04* (2006.01)
*F02N 11/00* (2006.01)
*F02D 29/06* (2006.01)

(52) U.S. Cl. ............ 290/34; 290/40 C; 290/38 R
(58) Field of Classification Search ............. 290/34, 290/40 B, 40 C, 40 A, 38 R, 46; 322/10; 310/113
See application file for complete search history.

(56) References Cited

U.S. PATENT DOCUMENTS

| | | | |
|---|---|---|---|
| RE27,868 E * | 1/1974 | Porter | 290/31 |
| 3,812,378 A | 5/1974 | Coman | |
| 3,902,073 A * | 8/1975 | Lafuze | 290/46 |
| 4,219,739 A * | 8/1980 | Greenwell | 290/46 |
| 4,743,777 A | 5/1988 | Shilling et al. | |
| 4,841,216 A | 6/1989 | Okada et al. | |
| 5,015,156 A | 5/1991 | Scholz | |
| 5,051,670 A | 9/1991 | De Piola | |
| 5,075,616 A * | 12/1991 | Mitsui | 322/10 |
| 5,092,748 A | 3/1992 | Simmons, II | |
| 5,338,165 A | 8/1994 | Brockner et al. | |
| 5,495,163 A | 2/1996 | Rozman et al. | |
| 5,593,287 A | 1/1997 | Sadakata et al. | |
| 5,818,116 A | 10/1998 | Nakae et al. | |
| 5,844,383 A | 12/1998 | Denaci | |
| 5,899,411 A | 5/1999 | Latos et al. | |
| 5,920,162 A | 7/1999 | Hanson et al. | |
| 5,977,645 A | 11/1999 | Glennon | |
| 6,018,199 A | 1/2000 | Shiroyama et al. | |
| 6,118,238 A | 9/2000 | Munro et al. | |
| 6,169,332 B1 | 1/2001 | Taylor et al. | |
| 6,242,881 B1 | 6/2001 | Giordano | |
| 6,265,786 B1 | 7/2001 | Bosley et al. | |
| 6,285,089 B1 | 9/2001 | Nelson | |
| 6,392,311 B2 * | 5/2002 | Inaba et al. | 290/38 R |
| 6,492,742 B1 * | 12/2002 | Fujikawa et al. | 290/40 C |
| 6,995,478 B2 * | 2/2006 | Xu et al. | 290/52 |
| 2001/0006292 A1 | 7/2001 | Inaba et al. | |
| 2001/0024075 A1 | 9/2001 | Caamano | |

* cited by examiner

*Primary Examiner*—Julio C. Gonzalez
(74) *Attorney, Agent, or Firm*—Carlson, Gaskey & Olds

(57) ABSTRACT

A starting system and method for a gas turbine engine applies a change in conventional starter generator torque profiles near the conclusion of the start cycle after the engine self sustaining speed and just prior to starter generator cut-out. By decreasing the applied torque to zero prior to transition from a start mode to a generator mode, both the mechanical and electrical transients are greatly decreased.

14 Claims, 3 Drawing Sheets

ELECTRICAL STARTER GENERATOR SYSTEM FOR A GAS TURBINE ENGINE

This invention was made with government support under Contract No.: N000019-02-C-3002. The government therefore has certain rights in this invention.

BACKGROUND OF THE INVENTION

The present invention relates to a starter system for a gas turbine engine, and more particularly to a control algorithm for an engine starter generator which operates to start a gas turbine engine.

In a conventional start system for a gas turbine engine, for example, an aircraft engine, a start sequence that coordinates engine speed, ignition and fuel delivery is required to achieve a reliable start. Conventionally, a dedicated starter motor or a starter-generator is driveably coupled to the gas turbine engine through a coupler shaft that drives the gas turbine engine when the starter generator system operates in a start mode and is driven by the gas turbine engine when the starter generator system operates in a generator mode. As the starter accelerates the engine, a fuel delivery pump provides fuel flow thereto. Igniters are then actuated to effect ignition in a combustor of the engine. Upon successful ignition, and once the engine has reached a self-sustaining speed, the starter is disengaged.

At the conclusion of the start cycle, the starter is transitioned to the generate mode under power, which may create a significant electrical transient to the power source that is supplying the electrical energy for the start. This transient may be problematic since the starter may not be supplied by a stiff electrical source for engine starts.

Furthermore, when the starter generator system transitions from Start mode to Generate mode, the electrical starter generator transitions from supplying mechanical power to absorbing mechanical power through the coupler shaft. This transition in power is accompanied by a change in the mechanical torque on the coupler shaft. This relatively sudden change in torque is effectively a step-function in which the torque is transmitted to the engine-mounted gearbox over a relatively short period of time. Such a torque transmission may result in undesirable mechanical load to the gearbox over prolonged periods of time.

Accordingly, it is desirable to provide a method of operating a starter generator system which minimizes electrical transients and the significant mechanical torque change applied to an engine gearbox of a gas turbine engine during the transition from a start mode to a generator mode.

SUMMARY OF THE INVENTION

The starter generator system for a gas turbine engine according to the present invention applies a change in conventional starter generator torque profiles near the conclusion of the start cycle after the engine self sustaining speed and just prior to starter generator cut-out. The starter generator applied torque is gradually reduced to zero prior to transition from starter mode to generator mode. By decreasing the applied torque to zero, both the mechanical and electrical transients associated with the heretofore step change in starter operation is avoided. This gradual decrease of torque results in much smaller electrical transients and also gradually removes the torque applied to the gearbox, reduces backlash, and thus prolongs the life of the mechanical components. Preferably, the starter generator applied torque is reduced to zero in accordance with a linear ramp function rather than a step function.

The present invention therefore provides a method of operating a starter generator system which minimizes electrical transients and the significant mechanical torque change applied to an engine gearbox of a gas turbine engine during the transition from a start mode to a generator mode.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
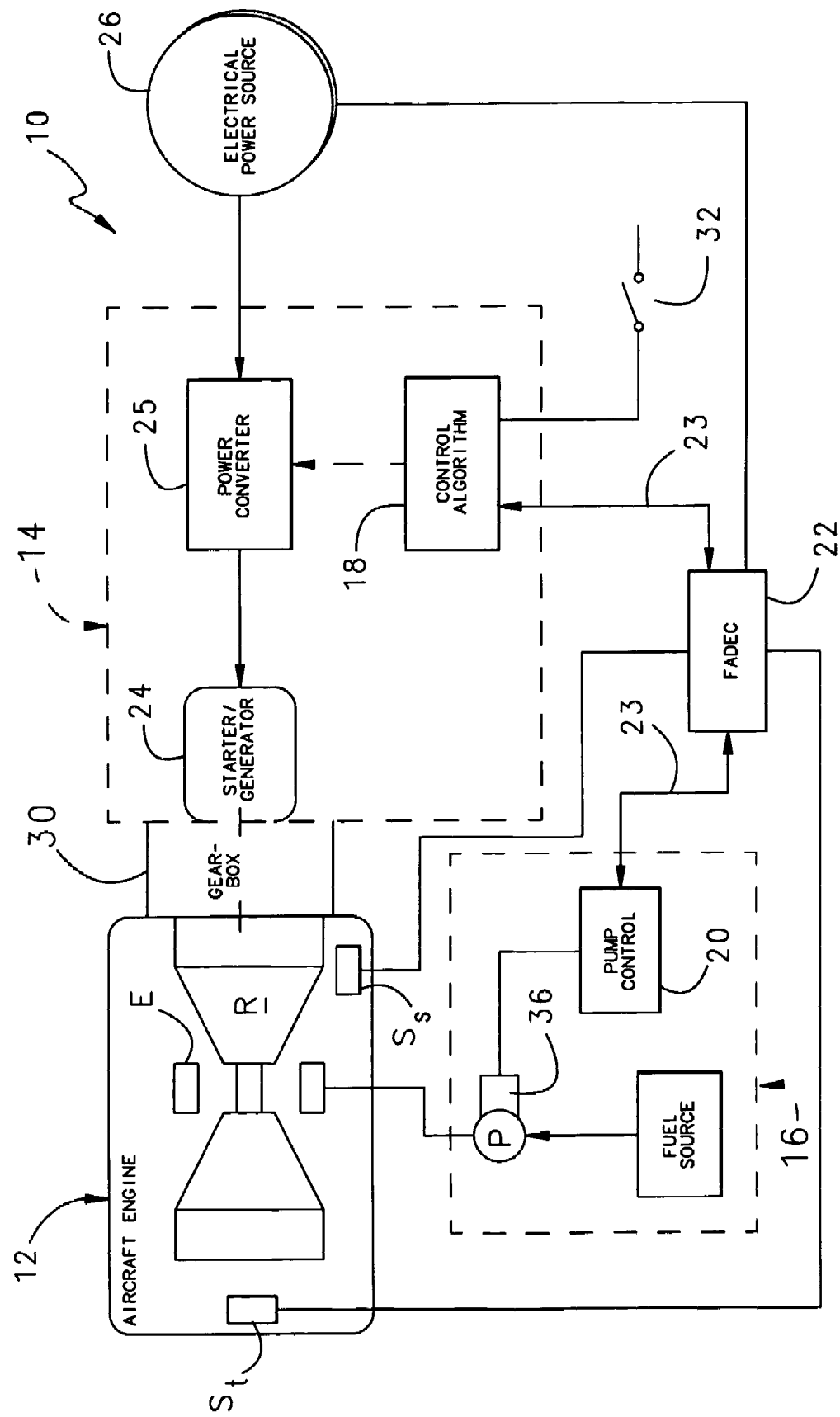
FIG. 1 is a schematic block diagram of a gas turbine engine starting system according to the present invention.

FIG. 1 illustrates a general schematic view of gas turbine engine system 10 such as a turbofan engine. The gas turbine engine system 10 generally includes a starter generator system 14 and a fuel system 16. Each system 14, 16 preferably includes an independent controller 18, 20 which operates each respective system. The controllers 18, 20 may be implemented by a suitably programmed microprocessor or any other processing device, together with any interface apparatus necessary to control the respective system 14, 16 and sensors therefore. The controllers 18, 20 additionally or alternatively communicate with each other through a central controller such as a full authority digital electronic control (FADEC) 22.

Preferably, the controllers 18, 20, 22 include closed loop feedback systems having linear control system logic such as proportional, integral, derivative (PID) paths to achieve the desired response and compensate for undesired destabilization forces. It should be understood that various controller and sensor arrangements will benefit from the present invention. Although schematically illustrated separately, the controllers may be combined into a single internal controller. The controllers communicate over a communication bus or the like (illustrated schematically at 23).

The starter generator system 14 generally includes a starter motor 24 that receives electrical power through a power converter 25 from an electrical power source 26 such as a battery or other AC or DC power source. The starter motor 24 preferably includes a brushless DC starter motor, an AC motor, or a Switched Reluctance motor that is connected to an engine rotor (illustrated schematically at R) of the gas turbine engine 12 through a gearbox 30 to provide torque thereto and receive torque therefrom. Alternatively, it should be understood that the starter motor 24 may directly rotate the rotor R without an intermediate gearbox, clutch or the like.

Once the gas turbine engine 12 achieves operating speed, the starter motor 24 is preferably operated as an electrical generator to power various loads developed by the fuel systems or other vehicle components.

The starter motor 24 is responsive to signals supplied by the starter system controller 18 and the FADEC 22. The FADEC controller 22 communicates with a sensor suite, such as a speed sensor Ss which senses the speed of the rotor R and a temperature sensor St which senses the exhaust gas temperature of the gas turbine engine 12. It should be understood the sensor suite may additionally or in the alternative comprise a multiple of other sensors. The starter system controller 18 is further responsive to a command signal which may be developed through actuation of a switch (illustrated schematically at 32) which initiates or terminates a start sequence.

The fuel system 16 generally includes a pump motor 36 which communicates with the fuel system controller 20 to drive a fuel pump P at variable speeds to supply fuel to an engine combustor E independent of the gas turbine engine speed.

Figure 2:
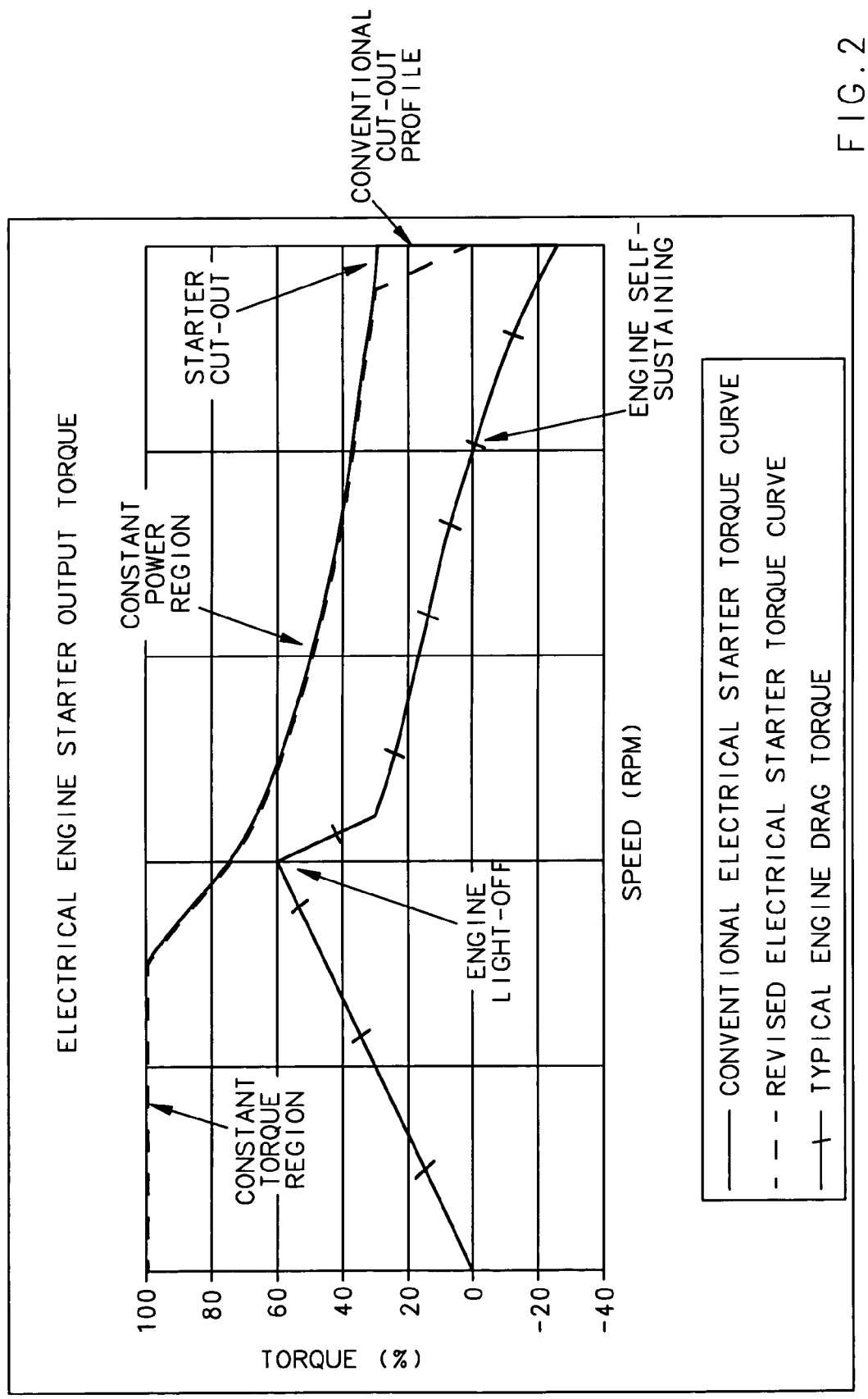
FIG. 2 is graphical representation of a starter generator torque curve.

Referring to FIG. 2, a torque curve depicts the starter motor 24 output torque overlaid with the gas turbine engine 12 drag torque during a start sequence. In operation, the start sequence according to the present invention is initiated by a start command such as by actuation of the start switch 32 (FIG. 1.) The starter system controller 18 commands the starter motor 24 to operate according to a torque curve as illustrated in FIG. 2. It should be understood that operation of the starter motor 24 according to the torque curve may be effectuated through various instruction sets programmed into the starter system controller 18 and/or FADEC 22.

When operation of the starter motor 24 is initiated, the starter motor operates within a constant torque region so that the gas turbine engine 12 is accelerated to a predetermined light off point to await ignition. Preferably, the light off point is approximately 18 percent of the gas turbine engine 12 normal operating speed, however, the light off point may be adjusted based upon correction factors such as ambient pressure, temperature, altitude, or the like to achieve reliable ignition. The correlation factors are preferably calculated by the controllers 18, 20, 22. Such correction greatly increases light off reliability.

Preferably, the starter motor 24 provides a constant controlled amount of assisting torque within the Constant Torque Region during acceleration of the gas turbine engine. The Constant Torque Region is the region of the starter torque curve where the output torque is constant such that the gas turbine engine 12 is accelerated to the predetermined light off point to await ignition. The Constant Torque Region assures optimization and coordination of the fuel schedule and acceleration of the gas turbine engine to minimize thermal transients which thereby increased the gas turbine engine operational life.

Once the gas turbine engine achieves a predetermined operating speed, the starter motor 24 enters a Constant Power Region which is a region of the starter torque curve where the output torque from the starter motor 24 is decreased as engine speed increases so as to maintain constant power. The starter motor 24 remains within the Constant Power Region until engine light off occurs and the engine begins acceleration under power. That is, the starter motor 24 torque is generally decreased as the gas turbine engine drag torque decreases during spool up of the engine.

After light-off the gas turbine is accelerated toward a self-sustaining speed. Engine self-sustaining speed is the speed at which the engine drag torque crosses zero torque. After crossing zero torque, the engine is producing torque and will continue under its own power. Once the gas turbine engine 12 has achieved a predetermined self-sustaining speed (here shown at approximately 30% torque), the starter motor 24 is powered down and begins operation as an electrical generator powered by the gas turbine engine 12 while the gas turbine engine 12 continues acceleration to it normal operating speed of 100 percent.

The instant invention applies a change in a conventional starter generator torque profile near the conclusion of the start cycle after the engine self sustaining speed and just prior to starter generator cut-out. Operation of the starter generator 24 according to the instant invention reduces applied torque from the operating speed which corresponds to the gas turbine engine 12 predetermined operating speed (here shown at approximately 30% torque) to zero in a linear fashion. That is, the reduction in starter generator 24 applied torque results in a ramp function from the predetermined operating speed to zero torque. This is in contrast to conventional starter generator transition in which the starter generator is simply switched from start mode to generator mode such that the transition results in a step-like function. The starter generator 24 applied torque is preferably controlled by the starter system controller 18

The following algorithm can be used to describe the linear ramp function at the end of the electrical starter torque curve where:

T=Torque
K=Constant
n=speed
$n_1$=speed at which the linear ramp function begins
$n_2$=speed at which the linear ramp function reaches zero torque During the constant power portion of the speed/torque curve:

$T \times n = K$, therefore $$T = \frac{K}{n}$$

When the speed, n, reaches the beginning of the linear ramp function, $n_1$, the torque can be described by:

$$T = \frac{K}{n}\left[\frac{n_2 - n}{n_2 - n_1}\right]$$

Figure 3:
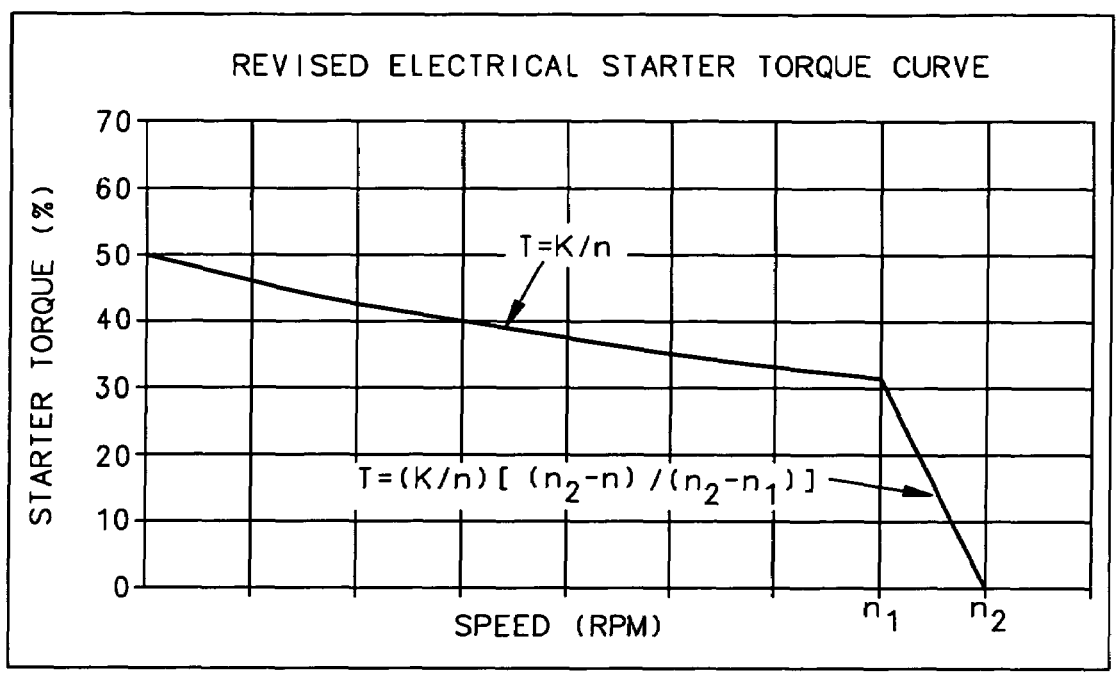
FIG. 3 is a graphical representation of the torque following the linear ramp function until it reaches zero torque at speed=$n_2$.

The torque follows this linear ramp function until it reaches zero torque at speed=$n_2$ (FIG. 3).

By decreasing the applied torque to zero prior or commensurate with transition from start mode to generator mode, both the mechanical and electrical transients associated with the heretofore step change transition is avoided. The decrease in torque according to the instant invention results in minimal electrical transients and gearbox backlash, thus prolonging operational life.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of operating a starter generator system comprising the steps of:
   (1) operating a starter motor to generate an output torque;
   (2) spooling up an engine with the output torque from the starter motor;
   (3) reducing the output torque from a constant power region in which the output torque is decreased in response to an increase in engine speed so as to maintain a generally constant power output, then reducing the output torque according to a ramp function having a slope steeper than that within the constant power region to approximately zero in response to transitioning the starter motor from a start mode in which the starter motor drives the engine to a generator mode in which the starter motor is driven by the engine.

2. A method as recited in claim 1, wherein the engine achieves a self-sustaining speed during said step (3).

3. A method as recited in claim 2, wherein the self-sustaining speed is an engine speed in which the engine achieves an approximately zero drag torque.

4. A method as recited in claim 1, further comprising the step of:
   (4) operating the starter motor as a generator after the engine lights off.

5. A method as recited in claim 1, wherein said step (3) includes:
   (a) reducing the output torque from a speed which relates to a predetermined engine operating speed to zero commensurate with transition from the start mode to the generator mode, the reduction represented as a ramp function in a starter generator torque profile curve.

6. A method of starting a gas turbine engine comprising the steps of:
   (1) operating a starter motor within a constant torque region to generate an output torque;
   (2) spooling up an engine with the output torque from the starter motor in response to said step (1);
   (3) operating the starter motor within a constant power region in which the output torque is decreased in response to an increase in engine speed so as to maintain a generally constant power output;
   (4) lighting off the gas turbine engine during said step (3);
   (5) reducing the output torque after said step (4) according to a ramp function having a slope steeper than that during said step (3) to approximately zero in response to transitioning the starter motor from a start mode in which the starter motor drives the engine to a generator mode in which the starter motor is driven by the engine.

7. A method as recited in claim 6, wherein said step (5) includes:
   (a) reducing the output torque from a speed which relates to a predetermined engine operating speed to zero commensurate with transition from the start mode to the generator mode, the reduction represented as a ramp function in a starter generator torque profile curve.

8. A method as recited in claim 6, wherein said step (5) includes:
   (a) reducing the output torque according to the algorithm $$T = \frac{K}{n}\left[\frac{n_2 - n}{n_2 - n_1}\right]$$

until a speed $n_2$ where T=Torque; K=Constant; n=speed; $n_1$=speed at which the linear ramp function begins at the transition between the start mode and the generator mode; $n_2$=speed at which the linear ramp function reaches zero torque.

9. A method of starting a gas turbine engine comprising the steps of:
   (1) operating a starter motor within a constant torque region to generate an output torque;
   (2) spooling up an engine with the output torque from the starter motor in response to said step (1);
   (3) operating the starter motor within a constant power region in which the output torque is decreased in response to an increase in engine speed so as to maintain a generally constant power output;
   (4) lighting off the gas turbine engine;
   (5) reducing the output torque to approximately zero in response to the gas turbine engine reaching a self-sustaining speed in which the engine achieves an approximately zero drag torque including reducing the output torque according to the algorithm $$T = \frac{K}{n}\left[\frac{n_2 - n}{n_2 - n_1}\right]$$

until a speed $n_2$ where T=Torque; K=Constant; n=speed; $n_1$=speed at which the linear ramp function begins at the transition between the start mode and the generator mode; $n_2$=speed at which the linear ramp function reaches zero torque.

10. A method as recited in claim 9, further comprising the step of:
   (6) operating the starter motor as a generator after the engine achieves the predetermined speed.

11. A method as recited in claim 9, wherein said step (5) includes:
   (a) reducing the output torque from a speed which relates to a predetermined engine operating speed to zero in response to transitioning the starter motor from a start mode in which the starter motor drives the engine to a generator mode in which the starter motor is driven by the engine.

12. A method of operating a starter generator system comprising the steps of:
   (1) operating a starter motor to generate an output torque;
   (2) spooling up an engine with the output torque from the starter motor;
   (3) reducing the output torque to approximately zero in response to transitioning the starter motor from a start mode in which the starter motor drives the engine to a generator mode in which the starter motor is driven by the engine including reducing the output torque according to a linear ramp function algorithm $$T = \frac{K}{n}$$

until a speed n1 where T=Torque; K=Constant; and n=speed, where $n_1$=speed at which the linear ramp function begins at the transition between the start mode and the generator mode; and reducing the output torque according to the algorithm $$T = \frac{K}{n}\left[\frac{n_2 - n}{n_2 - n_1}\right]$$

until a speed $n_2$ where $n_2$=speed at which the linear ramp function reaches zero torque.

13. A method of starting a gas turbine engine comprising the steps of:
  (1) operating a starter motor within a constant torque region to generate an output torque;
  (2) spooling up an engine with the output torque from the starter motor in response to said step (1);
  (3) operating the starter motor within a constant power region in which the output torque is decreased in response to an increase in engine speed so as to maintain a generally constant power output;
  (4) lighting off the gas turbine engine;
  (5) reducing the output torque to approximately zero in response to transitioning the starter motor from a start mode in which the starter motor drives the engine to a generator mode in which the starter motor is driven by the engine including reducing the output torque according to a linear ramp function algorithm $$T = \frac{K}{n}$$

until a speed n1 where T=Torque; K=Constant; and n=speed, where $n_1$=speed at which the linear ramp function begins at the transition between the start mode and the generator mode.

14. A method of starting a gas turbine engine comprising the steps of:
  (1) operating a starter motor within a constant torque region to generate an output torque;
  (2) spooling up an engine with the output torque from the starter motor in response to said step (1);
  (3) operating the starter motor within a constant power region in which the output torque is decreased in response to an increase in engine speed so as to maintain a generally constant power output;
  (4) lighting off the gas turbine engine;
  (5) reducing the output torque to approximately zero in response to transitioning the starter motor from a start mode in which the starter motor drives the engine to a generator mode in which the starter motor is driven by the engine including reducing the output torque according to the algorithm $$T = \frac{K}{n}\left[\frac{n_2 - n}{n_2 - n_1}\right]$$

until a speed $n_2$ where T=Torque; K=Constant; n=speed; $n_1$=speed at which the linear ramp function begins at the transition between the start mode and the generator mode; $n_2$=speed at which the linear ramp function reaches zero torque.

* * * * *